(12) United States Patent
Brown et al.

(10) Patent No.: US 10,097,527 B2
(45) Date of Patent: Oct. 9, 2018

(54) AUTHENTICATION MANAGEMENT

(71) Applicant: International Business Machines Corporation, Armonk, NY (US)

(72) Inventors: Kevin C. Brown, Chandler's Ford (GB); Peter W. Jenkins, Chandler's Ford (GB); Stephen D. Pipes, Winchester (GB); Larissa C. Romualdo Suzuki, London (GB)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/832,718

(22) Filed: Aug. 21, 2015

(65) Prior Publication Data

US 2016/0065554 A1 Mar. 3, 2016

(30) Foreign Application Priority Data

Aug. 26, 2014 (GB) .................................. 1415067.6

(51) Int. Cl.
*H04L 29/06* (2006.01)
*G06F 21/31* (2013.01)
*G06F 21/62* (2013.01)

(52) U.S. Cl.
CPC .............. *H04L 63/08* (2013.01); *G06F 21/31* (2013.01); *G06F 21/629* (2013.01); *H04L 63/105* (2013.01); *H04L 63/107* (2013.01); *H04L 63/20* (2013.01); *G06F 2221/2111* (2013.01); *G06F 2221/2113* (2013.01)

(58) Field of Classification Search
CPC ..... H04L 63/08; H04L 63/105; H04L 63/107; H04L 63/20; G06F 21/31
See application file for complete search history.

(56) References Cited

U.S. PATENT DOCUMENTS 8,572,391 B2 10/2013 Golan et al.
8,595,808 B2 11/2013 Langley
(Continued)

FOREIGN PATENT DOCUMENTS

WO  WO2009143322 A2  2/2001
WO  WO2010056655 A1  5/2010
(Continued)

OTHER PUBLICATIONS

Chen, Achieve User Authentication and Seamless Connectivity on WiFi and WiMAX Interworked Wireless City, 2007 IFIP International Conference on Wireless and Optical Communications Networks, 2007, pp. 1-5 (Year: 2007).*
(Continued)

*Primary Examiner* — Luu T Pham
*Assistant Examiner* — Harvey I Cohen
(74) *Attorney, Agent, or Firm* — Yee & Associates, P.C.; Michael P. O'Keefe

(57) ABSTRACT

A method of managing authentication during a user session comprises the steps of operating a user session for a specific user, maintaining a user authentication level for the user session, monitoring one or more factors relating to the user's activity, applying one or more rules to the monitored factors, detecting that a rule has indicated the user's current authentication level is too high, and lowering the user's authentication level, without ending the user's session.

15 Claims, 6 Drawing Sheets

(56) References Cited

U.S. PATENT DOCUMENTS

| | | |
|---|---|---|
| 8,635,662 B2 | 1/2014 | Lang |
| 2004/0083394 A1 | 4/2004 | Brebner et al. |
| 2005/0193211 A1* | 9/2005 | Kurose .................. G06F 21/31 713/185 |
| 2009/0199264 A1 | 8/2009 | Lang |
| 2009/0221265 A1* | 9/2009 | Liu ...................... H04W 12/06 455/411 |
| 2009/0276823 A1 | 11/2009 | Vogler et al. |
| 2010/0192209 A1* | 7/2010 | Steeves ................ G06F 21/316 726/7 |
| 2011/0047608 A1* | 2/2011 | Levenberg .......... H04L 63/0807 726/7 |
| 2011/0092185 A1* | 4/2011 | Garskof .................. G06F 21/35 455/411 |
| 2011/0307941 A1 | 12/2011 | Dhanakshirur et al. |
| 2012/0323717 A1 | 12/2012 | Kirsch |
| 2013/0067546 A1 | 3/2013 | Thavasi et al. |
| 2013/0337769 A1* | 12/2013 | Bhatia ................ H04L 41/5022 455/406 |
| 2014/0094159 A1* | 4/2014 | Raleigh ................ H04W 24/02 455/418 |
| 2014/0195425 A1* | 7/2014 | Campos ................ G06Q 20/20 705/41 |
| 2014/0289820 A1* | 9/2014 | Lindemann ........... G06Q 20/42 726/5 |

FOREIGN PATENT DOCUMENTS

| | | |
|---|---|---|
| WO | WO0111451 A1 | 4/2011 |
| WO | WO2014153462 A2 | 9/2014 |

OTHER PUBLICATIONS

Lee et al., Authentication for WiFi-WiBbro-based BWAN interworking, ACM, MobiHoc08: Proceedings of the 9th ACM, MobiHoc08: Proceedings of the 9th ACM international symposium on Mobile ad hoc networking and computing, May 2008 (Year: 2008).*

Leroy et al., Enhanced wireless roaming security using three-party authentication and tunnels, ACM, Dec. 2009 U-NET '09: Proceedings of the 1st ACM workshop on User-provided networking: challenges and opportunities, 2009 (Year: 2009).*

United Kingdom Intellectual Property Office Search Report, dated Feb. 3, 2015, regarding Application No. GB1415061T6, 5 pages.

"User Behavior Based Access Control System," IP.com Prior Art Database Disclosure No. IPCOM000230702D, Sep. 4, 2013, 2 pages.

* cited by examiner

AUTHENTICATION MANAGEMENT

CROSS-REFERENCE TO RELATED APPLICATION(S)

This application claims the benefit of priority to United Kingdom Patent Application No. GB 1415067.6, filed Aug. 26, 2014, the entire contents of which are incorporated herein by reference.

FIELD OF THE INVENTION

This invention relates to a method of, and system for, managing authentication during a user session.

BACKGROUND

In many different applications, users have to be authenticated. For example, when a user accesses online banking services, they will need to perform some form of authentication using a password and possibly other authentication processes to access the online banking service. In providing access to data storage systems, it is also common to authenticate users who which to access and/or change information that is stored by the storage system. It is also common to have different levels of authentication, with so-called step-up authentication being used if the user wishes to undertake a specific task during their user session. For example, in the case of an online banking service, the transfer of money above a certain level may well require the user to entire further secure information to authenticate the particular transaction. In the case of the data storage system, the ability to delete files may require a higher level of authorization for the current user session.

This concept of step-up authentication is applied to situations where elevated authority is required during a user session, perhaps for a limited period of time. For example, a user may elevate their session privilege from the command line by authenticating with sudo. The same user may then intentionally reduce the level of authority associated with their session once the elevated task has been completed. However, the decision to reduce the user's level of authority is taken by the user themselves.

BRIEF SUMMARY OF THE INVENTION

According to a first aspect of the present invention, there is provided a method of managing authentication during a user session, the method comprising the steps of operating a user session for a specific user, maintaining a user authentication level for the user session, monitoring one or more factors relating to the user's activity, applying one or more rules to the monitored factors, detecting that a rule has indicated the user's current authentication level is too high, and lowering the user's authentication level, without ending the user's session.

According to a second aspect of the present invention, there is provided a system for managing authentication during a user session, the system comprising a processor arranged to operate a user session for a specific user, maintain a user authentication level for the user session, monitor one or more factors relating to the user's activity, apply one or more rules to the monitored factors, detect that a rule has indicated the user's current authentication level is too high, and lower the user's authentication level, without ending the user's session.

According to a third aspect of the present invention, there is provided a computer program product on a computer readable medium for managing authentication during a user session, the product comprising instructions for operating a user session for a specific user, maintaining a user authentication level for the user session, monitoring one or more factors relating to the user's activity, applying one or more rules to the monitored factors, detecting that a rule has indicated the user's current authentication level is too high, and lowering the user's authentication level, without ending the user's session.

Owing to the invention, it is possible to provide a method for extending established stepped authentication schemes to enforce an automated, periodic validation of intent, leading to an automated step-down of privilege. The validation process is policy-driven and has the ability to reduce the level of privilege associated with a user's session, thereby de-authorising the user or "stepping-down" their current level of authorization. The evaluation depends on one or more factors to determine if a condition for step-down has been met. The methodology operates by utilising a system-configurable set of factors, such as current location, the user's activity history or predictive analysis that indicates that a raised authority is no longer, or is not likely to be, required.

In summary, the purpose of step-down, as with step-up, is to provide a granular mechanism for risk management. The purpose of automating the step-down process is to move the management responsibility from the user, whose priority is to perform a task as quickly and/or cheaply as possible, to an autonomous service where the priority can be managed in policy by the business or service provider. The level of the user's authentication in the current session can be automatically reduced, without the user being logged out of their current activity.

For example, a user having previously stepped-up their level of access, is now performing tasks for which a lower level would suffice. Given that their intent has changed, the system may autonomously reduce their privilege to an appropriate level. In another example, a user has elevated access but performs an activity in an unusual fashion, based on usage analysis. The method for step-down has important implications and benefits in situations where the confidence of the system that a user is who they claim to be may vary, improving and degrading, over time during a single user session. The system autonomously evaluates a condition for reducing privilege based on combined factors, without the need for, and regardless of, user involvement in the evaluation process.

A privilege level is associated with the user's current session. This level increases as the user steps-up and decreases as the user steps-down. The exact nature of the privilege level is solution-specific: a percentage may be suitable for some cases, whereas a simple 1-2-3-4 indicator may be sufficient for others. In all cases, the step-up/step-down mechanism has a differentiating effect on the privilege level on a given session. The methodology provides an autonomous, context-sensitive step-down authentication process that decreases the privilege level.

The automatic change in the user's authentication level with respect to the current session will happen transparently in the background as the user is performing tasks in the current session. The user is not necessarily aware of the change in their level of authentication, but it can also be outputted to the user, for example using an on-screen indication. This on-screen indication may use a numbering system or colour system, for example, to indicate to the user the user's authentication level of the current session. As the user performs actions in the current session, this may lead to the automatic step-down in authorization, and this can be shown to the user through the on-screen symbol.

In one preferable embodiment, the user's current authentication level can be detected as being too high when the authentication level of the user's current task is lower than the user's current authentication level for a predefined time period. If the user has previously raised their authentication level for a specific purpose (for example for a money transfer in an online banking system) then this raised level may no longer be needed. As the user continues with their session, they may continue with activities such as checking bank balances and interest rates and so on. These lower level tasks, in authentication terms, after a predefined time period has elapsed, will result in the system automatically lowering the user's authentication to a level that is appropriate for the current task.

BRIEF DESCRIPTION OF THE DRAWINGS

Preferred embodiments of the present invention will now be described, by way of example only, with reference to the following drawings, in which.

DETAILED DESCRIPTION OF THE DRAWINGS

Figure 1:
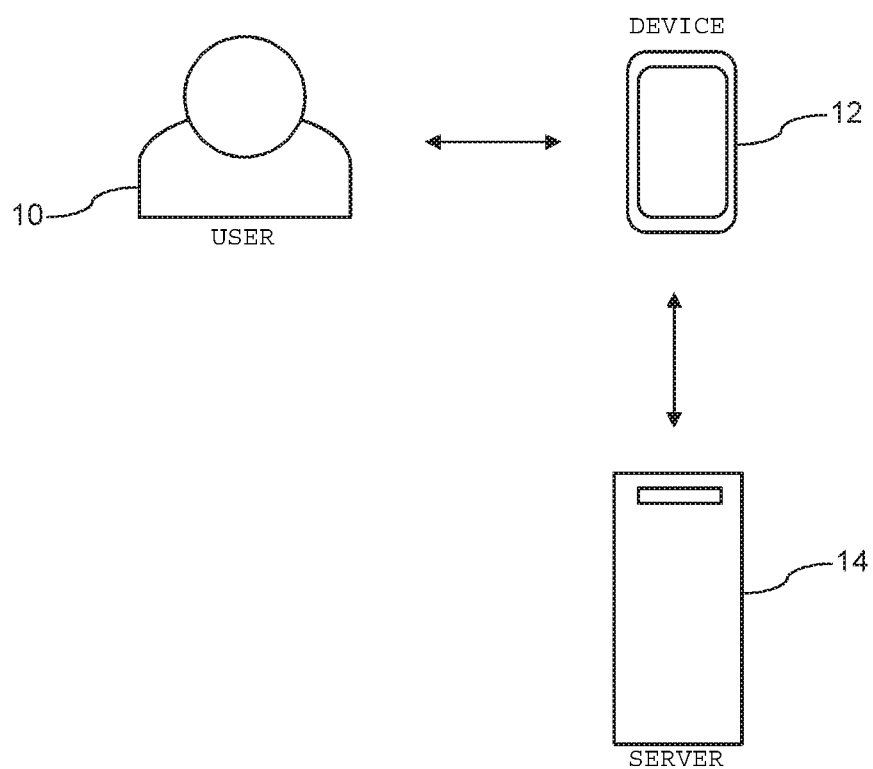
FIG. 1 is a schematic diagram of a user accessing online banking with a mobile device.

An example scenario in the context of a mobile banking session is illustrated by FIG. 1, which shows a user 10 with a mobile device 12 who is accessing an online banking application run by a server 14. The user 10 logs into a mobile app being run by their device 12. The user 10 checks their account balance. All user activity is captured by the server 14 for analysis. The user 10 clicks a "Make Payment" option and is required to authenticate again to step-up to an appropriate level of privilege. This user activity is captured by the server 14 for analysis and the user interface of the device 12 may visually represent the current level of privilege. The user 10 performs the online payment.

Once the payment has been made, the user 10 no longer requires elevated access to their account. If the user 10 continues to interact with the app, for example by performing low-risk tasks, the server 14 may deduce that the elevated privilege is no longer required (for example a policy could enforce a maximum number of low-risk actions before step-down must be enforced). At this point the user's privilege is reduced to a more appropriate level, based on an analysis of tasks currently being performed. This step-down is completely autonomous, initiated by the server 14 based upon analysis of one or more factors, such as activity history and environmental aspects, such as current location. For example, should there be a significant change in the local context such that the phone 12 moves beyond a boundary of a safe location such as the user's home, then this can be used as the basis for a step-down in authentication.

As a simple example implementation, the step-down algorithm run by the server 14 may count the number of low-risk tasks performed and once a threshold has been met would perform the step-down. Other implementations are feasible and may include additional factors, that are environmental, temporal or user-activity based. A variation of the scenario has an unauthorised user attempt to use the mobile banking app. In the event that they are able to log in (for example a family member is given the password, or the app was previously left logged in), then the server 14 may deduce that the user 10 does not interact in the same style and decide to enforce an automated step-down to contain the risk.

Figure 2:
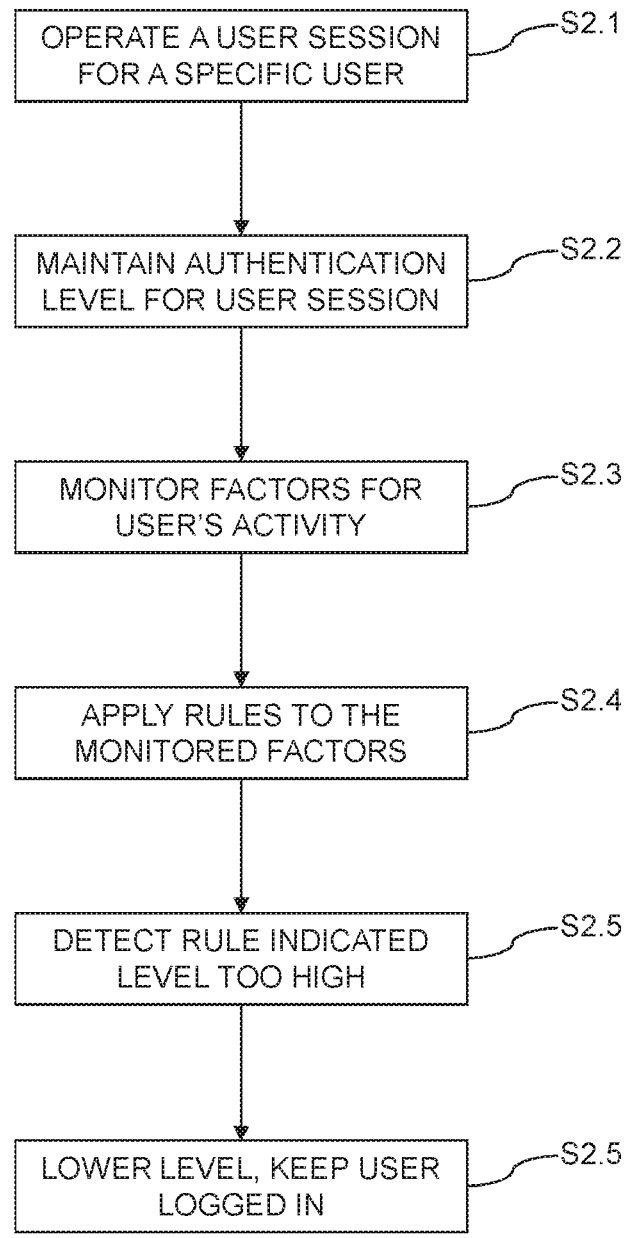
FIG. 2 is a flowchart of a method of managing authentication in a user session.

FIG. 2 shows a flowchart that summarises the method of managing authentication during a user session. Once a user 10 has connected to a service or accessed a file system that requires the user 10 to identify themselves, then a user session has been started. The user may also have performed some sort of authentication, for example by supplying a password, when the user session was initiated. The method comprises, firstly, step S2.1, which comprises operating the user session for the specific user 10. At step S2.2, the method also comprises maintaining a user authentication level for the user session. The authentication level can be a simple numerical scale from 1 to 4, for example, where 1 is the lowest level of authentication and 4 is the highest level.

The next step in the method is step S2.3, which comprises monitoring one or more factors relating to the user's activity. These factors could be the authentication level of the user's current task and/or the current location of the user, for example. In the illustration of FIG. 1, the server 14 is delivering the online banking service and is also capturing the information about the user's current session that is defined by the different factors. These factors are stored continually for the specific user 10 and are used to drive the decision concerning whether it is appropriate to the step-down the current authentication level of the user for the current user session.

At step S2.4, the next step of the method comprises applying one or more rules to the monitored factors. Predefined rules are applied to the monitored factors and at step S2.5 if it is detected that a rule has indicated the user's current authentication level is too high, then at step S2.6 the user's authentication level is lowered, without ending the user's session. For example, a rule may define the user's current authentication level as being too high when the authentication level of the user's current task is lower than the user's current authentication level for a predefined time period. Once this rule fires in relation to the relevant monitored factor, then the user's authentication level will be reduced.

Figure 3:
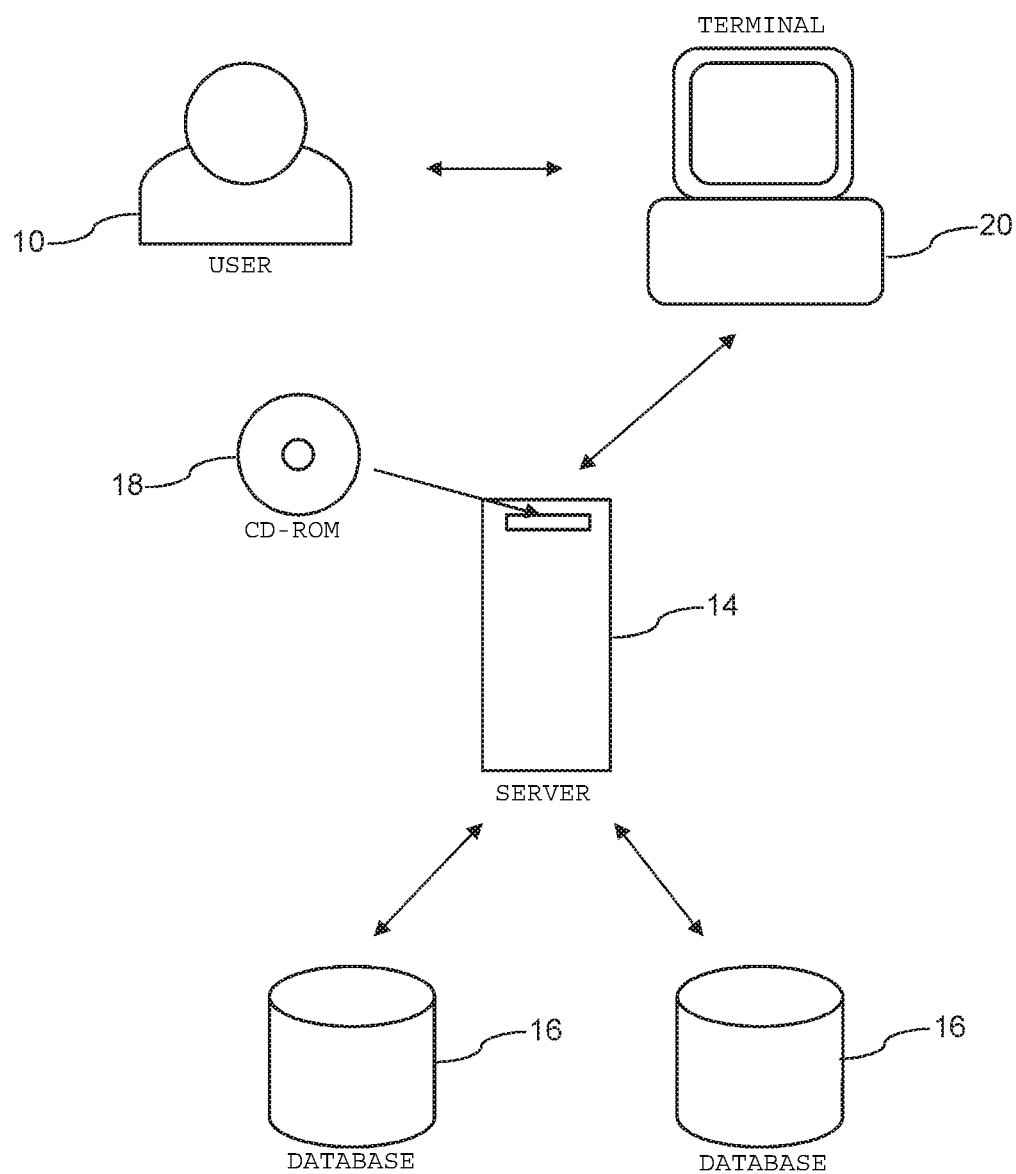
FIG. 3 is a schematic diagram of a user accessing a file management system.

FIG. 3 shows a different arrangement, whereby the user 10 is accessing a file management system that is stored by multiple databases 16. Access to the databases 16 is mediated by the server 14, which is controlled by a computer program product on a computer readable medium 18, which is a CD-ROM 18. The server 14 has a processor which is operated by instructions of the computer program product that is stored by the CD-ROM 18. The user connects to the server 14 via a terminal 20, which is a conventional desktop computing system that is connected to the server 14 via a local network such as an Ethernet network.

The user's authentication level can be defined as a simple numerical scale from 1 to 4, where 1 is the lowest level of authentication and 4 is the highest level. In this example, level 1 could equate to read-only access to unrestricted files, level 2 could equate to read-only access to all files, level 3 could equate to read-only access to all files plus read/write access to unrestricted files and level 4 could equate to read/write access to all files. This hierarchy of authorization levels is mediated by the server 14 which is operating the user's session with respect to the access to the file system stored by the databases 16.

When the user 10 first logs-in to create a new user session, the server 14 will set the user's authorization level to a default level, which could be level 1. If the user 10 wishes to step-up their level of authorization, for example because they wish to amend a file, then they will need to perform the necessary step-up authorization, such as supplying a password, or using a smartcard with a smartcard reader connected to their terminal 20. The server 14 is constantly monitoring the user's interaction and will automatically step-down the user's authorization after any step-up if the relevant criteria are met which will dictate the automatic reduction in the user's authentication level for the current user session.

Figure 4:
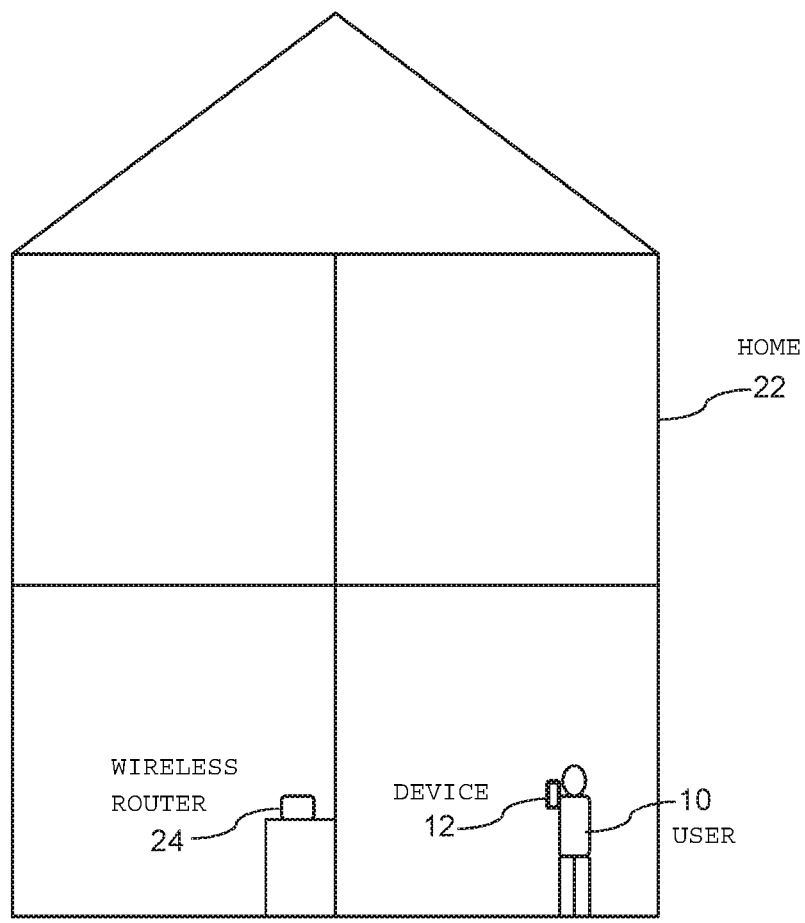
FIG. 4 is a further schematic diagram of a user accessing online banking with a mobile device.

FIG. 4 shows the user 10 with their mobile device 12 inside their home 22. The user 10 is accessing an online banking service via their mobile device 12. The mobile device 12 is connected via a local wireless network (such as WiFi) to a local wireless router 24, which has a wired connection to an external network such as the Internet. The user's mobile device 12 also has wide area wireless connectivity such as that provided by the wireless 3G network. The mobile device 12 will default to using the local wireless network provided by the wireless router 24. If the local wireless connection is unavailable, then the connection will switch to the 3G service.

As the user 10 accesses their online banking service, then they create a user session, which will have an authentication level maintained for that user session, which will be stepped-up as needed, depending on the tasks undertaken by the user 10 during the user session. Various factors of the user are monitored during the user session which relate to the user's activity. A monitored factor can comprise the current location of the user 10, which can be inferred from the location of the mobile device 12. Most mobile devices with wireless connectivity can have their location identified reasonably accurately, either by using GPS information from the device 12 or through knowledge of the current mobile phone cell.

As discussed above, various rules are used to determine if the user's current authentication level is too high and should be automatically reduced. A rule can define the user's current authentication level as being too high when the user's current location is outside of a predefined safe territory. This safe territory may be defined as the user's home 22, for example and in this case, should the mobile device 12 be detected as being no longer in the user's home, then an automatic step-down of the user's authentication can be performed. The provider of the online banking service can monitor the user's location during their user session and react to changes in that location, according to the rules relating to the topic.

Figure 5:
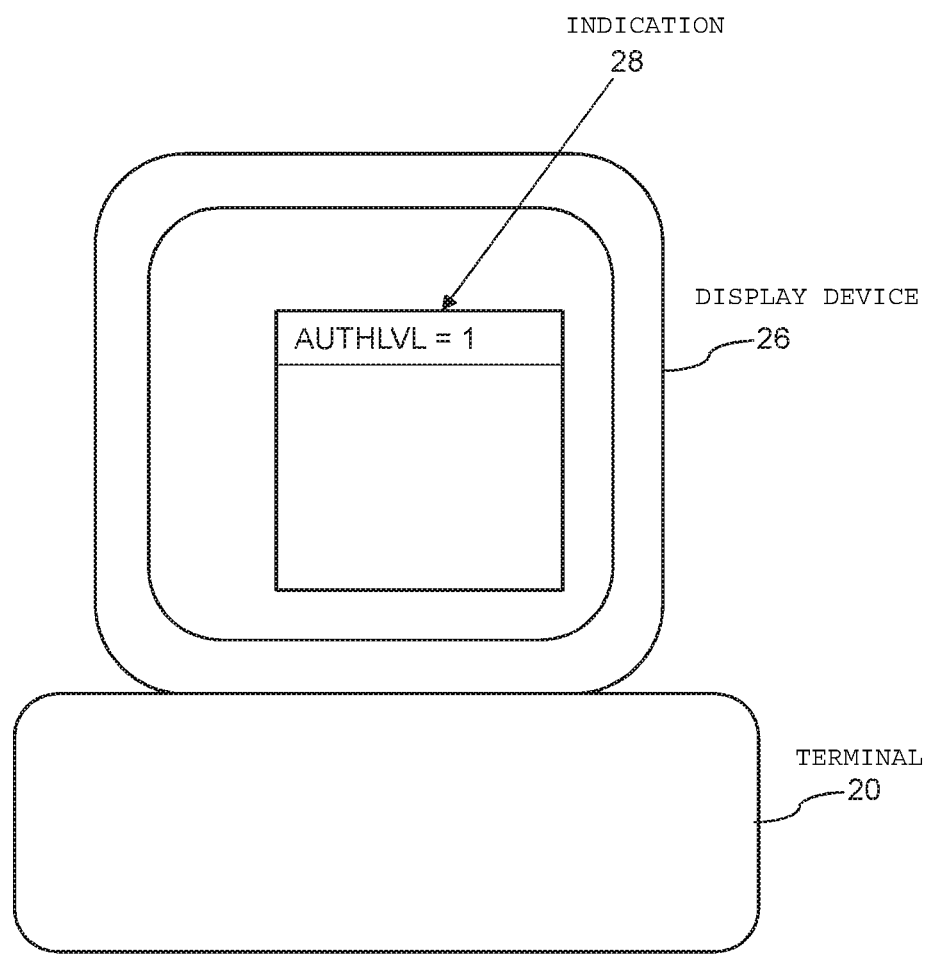
FIG. 5 is a schematic diagram of a computer terminal.

FIG. 5 shows a further view of the terminal 20, used in the example of FIG. 3, where the user 10 is accessing a file management system. The terminal 20 includes a display device 26, which provides a graphical user interface to the file management system. The user interacts with the file management system through the graphical user interface and logs-in to create their user session via the graphical user interface. To create a user session, the user must log-in with their username and password, which will set the user's authentication level to the lowest possible level, level 1. If the user wishes to the perform actions that require a higher authentication level, then they will need to later step-up their authentication level.

The graphical user interface includes within it an indication 28, which is an indication of the user's current authentication level. Although in this example, the authentication level is defined as being on a numerical scale from 1 to 4, other indications 28 could be used, for example using colour or English language terms, such as "low", "medium" and "high". The indication 28 is provided to inform the user 10 of the current level of authentication that the user has during the current user session. As the user 10 steps-up their authentication level, for example by entering an administrator's password to delete files within the file management system, then this will be reflected by change to the indication 28.

Similarly, if there is any step-down in the user's authentication level then the indication 28 will change in response to the lowering of the user's authentication level. The user 10 is provided with immediate visual feedback of the change in the authentication level of the user 10 for the current user session. As discussed above, the monitoring process that may change the user's authentication level occurs transparently in the background and the user 10 may otherwise be unaware of the change in their current authorization level. The use of the indication 28 ensures that visual feedback is provided to the user 10, in relation to their current authentication level for the current user session.

Figure 6:
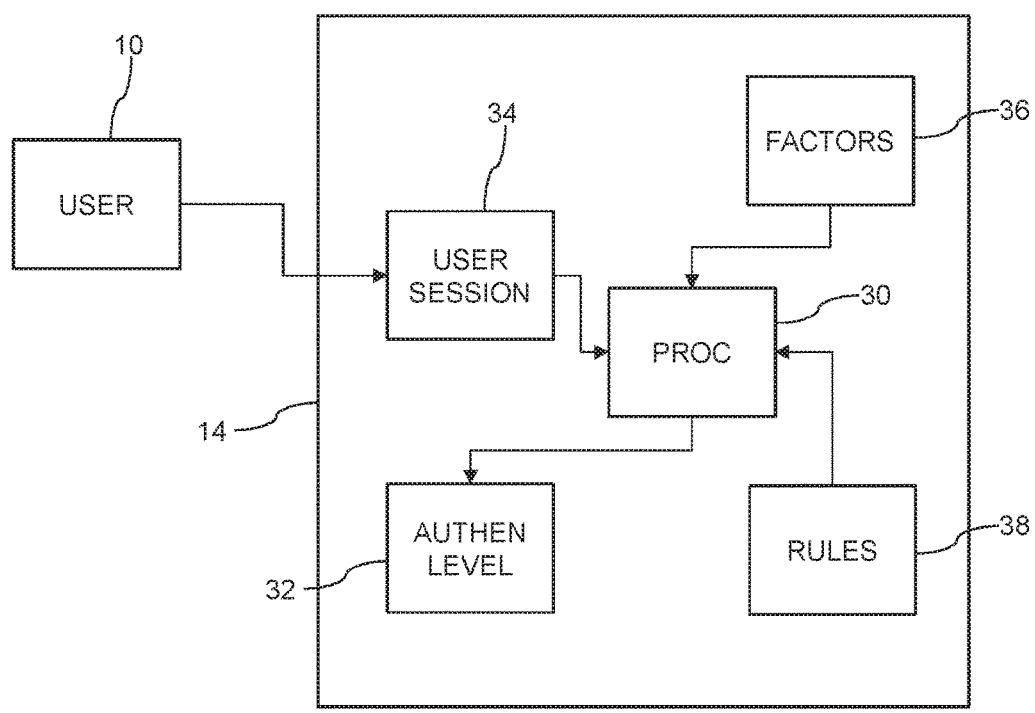
FIG. 6 is a schematic diagram illustrating the calculation of an authorization level.

FIG. 6 illustrates schematically the calculation of an authentication level 32, from the point of view of the server 14, which includes a processor 30 that is responsible for the maintaining of the user's current authorization level 32. The processor 30 is shown as a standalone component within the server 14, but is essentially a software function that is being executed by a suitable hardware component that is performing other processing tasks in parallel. As detailed above, an appropriate computer program product comprised of a set of instructions controls the operation of the automatic process that sets the authentication level 32. Any changes to the authentication level are determined by the processor 30.

The user 10 initiates a user session 34, which is run by the server 14, and the processor 30 monitors the user session 34 with respect to the defined factors 36, which define those factors 36 that relate to the user's activity that are to be monitored during the user session 34. As discussed above, the factors 36 could relate to a wide range of different aspects of the user's activity. For example, the tasks being undertaken by the user 10 can be monitored and classified according to the type of task undertaken, for example with a view to understanding the authentication level 32 required by those tasks.

Also available to the processor 30 are the rules 38 that define how the monitored factors 36 are to be interpreted in order to result in a change to the authorization level 32. Any automatic step-down in the authentication level 32 is defined by the rules 38 which contain clauses relative to the monitored factors 36. The processor 30 will continually check the rules 38 against the monitored factors 36 to see if any defined circumstance has arisen that will lead to the automatic stepping-down of the current authentication level 32 for the current user session 34. In this way a seamless and transparent process is run that will lower the user's authentication level 32 if it is determined that the level 32 is too high.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:
1. A computer-implemented method of managing authentication during a currently active user session, the computer-implemented method comprising:
   accessing, by a server, an online service for a user of a mobile device connected to a local wireless network inside a residence of the user, wherein the local wireless network is connected to an external network connecting the mobile device to the server;

operating, by the server, the currently active user session specific to the user at a current high authentication level corresponding to a high-risk activity performed by the user on the online service;
monitoring, by the server, a current location of the user during the currently active user session on the online service specific to the user based the mobile device being connected to the local wireless network inside the residence of the user, wherein a rule defines a current authentication level of the user that exceeds a predetermined threshold for intent of the user when the monitored current location of the user during the currently active user session on the online service specific to the user is outside of the residence of the user;
detecting, by the server, whether the monitored current location of the user during the currently active user session on the online service specific to the user is outside the residence of the user based on the mobile device no longer being connected to the local wireless network inside the residence of the user; and
lowering, by the server, the current high authentication level of the user to a lower level of authentication autonomously during the currently active user session on the online service specific to the user and without ending the currently active user session on the online service specific to the user in response to the server detecting that the monitored current location of the user during the currently active user session on the online service specific to the user being outside the residence of the user based on the mobile device not being connected to the local wireless network inside the residence of the user.

2. The computer-implemented method according to claim 1, wherein a monitored factor comprises an authentication level of a current activity of the user during the currently active user session on the online service specific to the user.

3. The computer-implemented method according to claim 1, further comprising:
detecting, by the server, that the user performed a number of low-risk activities on the online service based on monitoring current activity of the user during the currently active user session on the online service specific to the user;
determining, by the server, whether the number of low-risk activities performed by the user on the online service during the currently active user session on the online service specific to the user is greater than or equal to a threshold number of low-risk activities after a predefined time period has elapsed; and
responsive to the server determining that the number of low-risk activities performed by the user on the online service during the currently active user session on the online service specific to the user is greater than or equal to the threshold number of low-risk activities after a predefined time period has elapsed, lowering, by the server, the current high authentication level of the user to the lower level of authentication autonomously during the currently active user session on the online service specific to the user.

4. The computer-implemented method according to claim 1, wherein a monitored factor comprises a system-configurable set of factors including the monitored current location of the user during the currently active user session on the online service specific to the user, an activity history of the user, and a predictive analysis indicating that an elevated authentication level of the user is no longer required.

5. The computer-implemented method according to claim 1, further comprising:
outputting, by the server, an on-screen indication of the current authentication level of the user to the mobile device corresponding to the user, wherein the on-screen indication of the current authentication level of the user is on a numerical scale from an authentication level of 1 to an authentication level of 4, the authentication level of 1 being a lowest authentication level and the authentication level of 4 being a highest authentication level, and wherein the authentication level of 1 provides the user with read-only access to unrestricted files in a file management system, an authentication level of 2 provides the user with read-only access to all files in the file management system, an authentication level of 3 provides the user with read-only access to all the files along with read/write access to the unrestricted files in the file management system, and the authentication level of 4 provides the user with read/write access to all of the files in the file management system; and
changing, by the server, the on-screen indication on the mobile device in response to the server lowering the current authentication level of the user during the currently active user session on the online service specific to the user.

6. A computer system for managing authentication during a currently active user session, the computer system comprising:
a processor within a server; and
a computer readable storage medium, in communication with the processor, having computer readable program instructions stored thereon, when executed by the processor directs the computer system to:
access an online service for a user of a mobile device connected to a local wireless network inside a residence of the user, wherein the local wireless network is connected to an external network connecting the mobile device to the server;
operate the currently active user session specific to the user at a current high authentication level corresponding to a high-risk activity performed by the user on the online service;
monitor a current location of the user during the currently active user session on the online service specific to the user based the mobile device being connected to the local wireless network inside the residence of the user, wherein a rule defines a current authentication level of the user that exceeds a predetermined threshold for intent of the user when the monitored current location of the user during the currently active user session on the online service specific to the user is outside of the residence of the user;
detect whether the monitored current location of the user during the currently active user session on the online service specific to the user is outside the residence of the user based on the mobile device no longer being connected to the local wireless network inside the residence of the user; and
lower the current high authentication level of the user to a lower level of authentication autonomously during the currently active user session on the online service specific to the user and without ending the currently active user session on the online service specific to the user in response to detecting that the monitored current location of the user during the currently active user session on the online service specific to the user being outside the residence of the user based on the mobile device not being connected to the local wireless network inside the residence of the user.

7. The computer system according to claim 6, wherein a monitored factor comprises an authentication level of a current activity of the user during the currently active user session on the online service specific to the user.

8. The computer system according to claim 6, further comprising instructions to direct the computer system to:
   detect that the user performed a number of low-risk activities on the online service based on monitoring current activity of the user during the currently active user session on the online service specific to the user;
   determine whether the number of low-risk activities performed by the user on the online service during the currently active user session on the online service specific to the user is greater than or equal to a threshold number of low-risk activities after a predefined time period has elapsed; and
   lower the current high authentication level of the user to the lower level of authentication autonomously during the currently active user session on the online service specific to the user in response to determining that the number of low-risk activities performed by the user on the online service during the currently active user session on the online service specific to the user is greater than or equal to the threshold number of low-risk activities after a predefined time period has elapsed.

9. The computer system according to claim 6, wherein a monitored factor comprises a system-configurable set of factors including the monitored current location of the user during the currently active user session on the online service specific to the user, an activity history of the user, and a predictive analysis indicating that an elevated authentication level of the user is no longer required.

10. The computer system according to claim 6, further comprising instructions to direct the computer system to:
    output an on-screen indication of the current authentication level of the user to the mobile device corresponding to the user, wherein the on-screen indication of the current authentication level of the user is on a numerical scale from an authentication level of 1 to an authentication level of 4, the authentication level of 1 being a lowest authentication level and the authentication level of 4 being a highest authentication level, and wherein the authentication level of 1 provides the user with read-only access to unrestricted files in a file management system, an authentication level of 2 provides the user with read-only access to all files in the file management system, an authentication level of 3 provides the user with read-only access to all the files along with read/write access to the unrestricted files in the file management system, and the authentication level of 4 provides the user with read/write access to all of the files in the file management system; and
    change the on-screen indication on the mobile device in response to the computer system lowering the current authentication level of the user during the currently active user session on the online service specific to the user.

11. A computer program product for managing authentication during a currently active user session, the computer program product comprising a non-transitory computer readable medium having instructions embodied thereon when executed by a computer direct the computer to:
    access an online service for a user of a mobile device connected to a local wireless network inside a residence of the user, wherein the local wireless network is connected to an external network connecting the mobile device to the computer;
    operate the currently active user session specific to the user at a current high authentication level corresponding to a high-risk activity performed by the user on the online service;
    monitor a current location of the user during the currently active user session on the online service specific to the user based the mobile device being connected to the local wireless network inside the residence of the user, wherein a rule defines a current authentication level of the user that exceeds a predetermined threshold for intent of the user when the monitored current location of the user during the currently active user session on the online service specific to the user is outside of the residence of the user;
    detect whether the monitored current location of the user during the currently active user session on the online service specific to the user is outside the residence of the user based on the mobile device no longer being connected to the local wireless network inside the residence of the user; and
    lower the current high authentication level of the user to a lower level of authentication autonomously during the currently active user session on the online service specific to the user and without ending the currently active user session on the online service specific to the user in response to detecting that the monitored current location of the user during the currently active user session on the online service specific to the user being outside the residence of the user based on the mobile device not being connected to the local wireless network inside the residence of the user.

12. The computer program product according to claim 11, wherein a monitored factor comprises an authentication level of a current activity of the user during the currently active user session on the online service specific to the user.

13. The computer program product according to claim 11, further comprising instructions to direct the computer to:
    detect that the user performed a number of low-risk activities on the online service based on monitoring current activity of the user during the currently active user session on the online service specific to the user;
    determine whether the number of low-risk activities performed by the user on the online service during the currently active user session on the online service specific to the user is greater than or equal to a threshold number of low-risk activities after a predefined time period has elapsed; and
    lower the current high authentication level of the user to the lower level of authentication autonomously during the currently active user session on the online service specific to the user in response to determining that the number of low-risk activities performed by the user on the online service during the currently active user session on the online service specific to the user is greater than or equal to the threshold number of low-risk activities after a predefined time period has elapsed.

14. The computer program product according to claim 11, wherein a monitored factor comprises a system-configurable set of factors including the monitored current location of the user during the currently active user session on the online service specific to the user, an activity history of the user, and a predictive analysis indicating that an elevated authentication level of the user is no longer required.

15. The computer program product according to claim 11, further comprising instructions to direct the computer to:
output an on-screen indication of the current authentication level of the user to the mobile device corresponding to the user, wherein the on-screen indication of the current authentication level of the user is on a numerical scale from an authentication level of 1 to an authentication level of 4, the authentication level of 1 being a lowest authentication level and the authentication level of 4 being a highest authentication level, and wherein the authentication level of 1 provides the user with read-only access to unrestricted files in a file management system, an authentication level of 2 provides the user with read-only access to all files in the file management system, an authentication level of 3 provides the user with read-only access to all the files along with read/write access to the unrestricted files in the file management system, and the authentication level of 4 provides the user with read/write access to all of the files in the file management system; and
change the on-screen indication on the mobile device in response to the computer lowering the current authentication level of the user during the currently active user session on the online service specific to the user.

* * * * *